UNITED STATES PATENT OFFICE.

L. ELL HURD, OF INDIANAPOLIS, INDIANA.

IMPROVEMENT IN COMPOUNDS FOR PREVENTING AND REMOVING SCALE IN STEAM-BOILERS.

Specification forming part of Letters Patent No. 157,285, dated December 1, 1874; application filed October 2, 1874.

*To all whom it may concern:*

Be it known that I, L. ELL HURD, of Indianapolis, Indiana, have invented a certain compound to be used for the removal and prevention of scale in steam-boilers, of which the following is a specification:

The nature of my invention consists in the employment of certain mineral and vegetable alkalies, in connection with substances that are rich with mucilage, glucose, and sugar, and also absorbent in their qualities, for the purpose of removing scale incrustations from steam-boilers, and for preventing its formation after removal.

To prepare my compound, take the following materials: No. 1. One thousand pounds of sal-soda, (or carbonate of soda,) pulverized. No. 2. Two hundred pounds of chestnut-oak bark, ground or crushed fine. No. 3. One hundred and fifty pounds of charcoal, pulverized. No. 4. One hundred and twenty-five pounds of muriate of ammonia, pulverized. No. 5. One hundred pounds of linseed-oil cake, ground fine. No. 6. Fifty pounds of burnt alum, pulverized. No. 7. Fifty pounds of sassafras-bark, pulverized. No. 8. Twenty-five pounds of potato-starch. Mix and thoroughly incorporate these articles, and the compound is ready for use.

If a steam-boiler is already incrusted with scale, put into it from six to eight pounds of the compound—*i. e.*, when the dimensions of the boiler are twenty-four feet long and forty-two to forty-eight inches in diameter. When the size of boiler varies from this the compound must be varied accordingly in quantity. It can be introduced into the boiler through the man-hole or other aperture. When introduced, fill up the boiler, and run for two weeks without blowing off, and then clean out. For the removal of scale it may require to be thus used for two or three times, depending upon quality of water used and the thickness of the scale. After the scale is removed it requires the use of only four pounds of the compound every two weeks to effectually prevent its reformation.

This preparation does not injure or corrode the boiler-plates, and causes no foaming of the water. It evades the necessity of overheating the boiler, thereby economizing the use of fuel, and lessening the danger of explosions.

What I claim as my invention is—

The compound for removal and prevention of scale in steam-boilers, composed of the ingredients set forth, and substantially in the proportions named.

L. ELL HURD.

Witnesses:
GEORGE C. HARDING,
A. G. GROOME.